United States Patent

[11] 3,598,978

| [72] | Inventor | Lawrence A. Rempert<br>Cranbury, N.J. |
|------|----------|---------------------------------------|
| [21] | Appl. No. | 754,228 |
| [22] | Filed | Aug. 21, 1968 |
| [45] | Patented | Aug. 10, 1971 |
| [73] | Assignee | RCA Corporation |

[54] OBJECT-POSITIONING SYSTEM AND METHOD
6 Claims, 5 Drawing Figs.

[52] U.S. Cl. .................................................235/151.11,
235/151.3, 250/202, 250/219 DF, 250/219 DR,
250/219 WD
[51] Int. Cl. ................................................G06f 15/46,
G01n 21/32
[50] Field of Search.......................................... 235/151.1,
151.11; 250/219, 202, 211, 222, 221; 77/32.2

[56] References Cited
UNITED STATES PATENTS

| 3,063,311 | 11/1962 | Beckwith et al. | 77/32.2 |
| 3,335,281 | 8/1967 | Willits | 250/219 X |
| 3,401,589 | 9/1968 | Druschel et al. | 250/202 X |
| 3,404,250 | 10/1968 | Griffiths | 250/219 X |
| 3,448,280 | 6/1969 | Blitchington et al. | 250/219 X |
| 3,497,705 | 2/1970 | Adler | 250/219 X |
| 3,502,882 | 3/1970 | Von Voros | 250/202 |

FOREIGN PATENTS

| 61,062 | 4/1968 | Germany | 235/151.1 |

*Primary Examiner*—Eugene G. Botz
*Assistant Examiner*—Felix D. Gruber
*Attorney*—H. Christoffersen ABSTRACT: The object which is to be positioned has light and dark areas and edges which define transitions between these areas. This object is placed beneath a light-sensing element such as an optical fiber. The object is then moved first in one direction and then in another direction to determine, with the aid of the light-sensing element and other means, the distances, in a given plane, between the initial position of the light-sensing element and two of the edges. This procedure may be repeated for other pairs of edges and the measured distances may be employed to determine and to correct the initial error in the object position.

OBJECT-POSITIONING SYSTEM AND METHOD

BACKGROUND OF THE INVENTION

In many industries where relative high precision is important, it is often necessary during the manufacturing process accurately to position small objects. This is particularly true in the electronics industry where, for example, the bonding of an integrated circuit semiconductor "chip" to a "board" or "substrate" with printed conductors thereon requires the highly precise positioning of the board relative to the chip to permit the chip accurately to be bonded to the conductors at a particular location on the board.

The object of the present invention is to provide a system for precisely positioning an object automatically and at relatively high speed.

SUMMARY OF THE INVENTION

In the system of the invention, relative movement in one direction is produced between the object and a reference point external of the object to determine the actual distance $d_e$ between a first indicium on the object and the reference point. Relative movement is then produced in the opposite direction between the object and the reference point in an amount to position the indicium a predetermined distance $d_f$ from the reference point, where $d_f$ is the actual distance between the indicium and reference point when the initial relative position of the object is correct. Steps similar to this are performed in another direction to determine the actual distance $d_g$ between a second indicium on the object and the reference point and to return the object to a position such that there is a distance $d_h$ between the second indicium and the reference point. In response to these relative movements, signals are produced indicative of $d_e-d_f$ and $d_g-d_h$ and these signals may be employed to determine the correction required in the relative position of the object.

DETAILED DESCRIPTION

Figure 1:
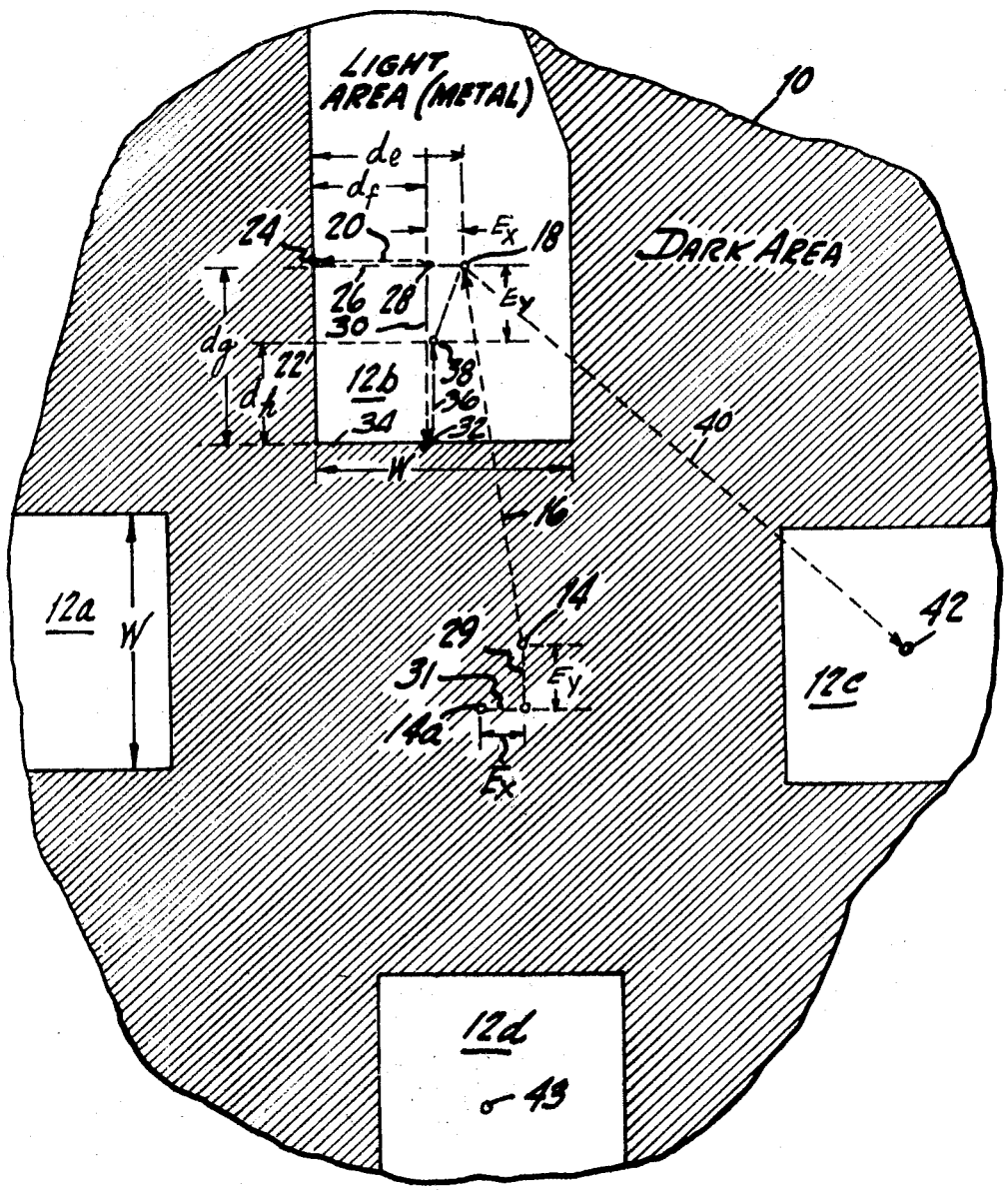
FIG. 1 is a plan view of a portion of a printed circuit board to help explain the steps in the operation of the positioning method of the invention.

The portion of the printed circuit "board" or substrate shown in FIG. 1 includes an insulating medium 10 which is relatively dark and metal regions 12a...12d which are relatively light. The metal regions are relatively small in size; for example, dimension W may be 2 to 4 mils (1 mil =0.001 inch).

The entire board may contain many regions such as shown in FIG. 1. Each such region is adapted to have secured thereto a small "chip" containing an integrated circuit which may include a number of interconnected semiconductor devices such as transistors. The chip itself (not shown) is mechanically held in a bonding tool (not shown) in a very accurately known-in-advance position above the board. The chip has metal "bonding pads" thereon in positions corresponding to the positions of the metal areas 12 on the board. However, before the chip can be placed in contact with and bonded to the board shown in FIG. 1, it is necessary very accurately to align a particular group of the metal areas 12 on the board with these bonding pads on the chip.

One solution to the problem, and this is a solution which is often employed, is to do the positioning manually. The board, a portion of which is shown in FIG. 1, is placed on a table underneath a microscope and an operator manually moves the table until the metal areas at a desired region of the board are directly beneath the corresponding bonding pads on the chip. A split image optical device may be employed to help the operator accurately to superimpose the image of the metal areas 12 on the board over the bonding pads on the chip. In the interest of saving time and achieving greater accuracy, however, it is preferred to be able to perform the positioning automatically. The way in which this automatic positioning is performed in accordance with the present invention is shown by the dashed lines in FIG. 1.

To start with, it may be assumed for purposes of the present introductory explanation that the board is placed in some predetermined position on a movable table. The initial alignment may be mechanical and may be achieved, for example, by securing the board tightly against alignment elements (not shown) such as pins, bars or the like, fixed to the table. Other mechanical alignment means are also possible.

If the initial alignment is highly accurate, a reference element, which in the present case is a fiber optics element of extremely small diameter (shown at 62 in FIG. 3), will be located at exactly the center position in the area surrounded by the terminals 12a...12d. In practice, however, the boards are not absolutely uniform in size and, due to errors in printing, the metal areas are not necessarily in the same position on each board. Therefore, in practice, the fiber optics element may be over a point 14 (FIG. 1) which is slightly (say from a fraction of mil to several mils) displaced from the center position.

In accordance with the present invention, after the initial positioning step above, the table is moved a given distance in a given direction, as indicated by dashed line 16, so that the fiber optics element is positioned over point 18 of terminal 12b. (Note that here and elsewhere the arrowhead, which represents the movement of the fiber optics element relative to the substrate, is pointing in the direction opposite to the direction of table movement.)

Next, the table is moved in the direction of dashed line 20 a distance $d_e$ sufficient for the fiber optics element to reach the edge 22 of the terminal 12b. The fiber optics element senses that it has reached point 24 at edge 22 by the light to dark transition which occurs at this edge. During this movement, a binary number indicative of the extent of movement is generated and stored.

Thereafter, the table is moved in the opposite direction, as indicated by dashed line 26, through a fixed distance $d_f$. The distance $d_f$ is a calculated-in-advance distance which may, if desired, be equal to one-half the width W of terminal 12b. Thus, if the chip initially were accurately centered, the distance $d_f$ would be equal to $d_e$ and the point 28 would fall over the point 18. In the example given by way of illustration, this is not the case and the error between these two distances is $E_x$.

After the scan above, the table is again moved, this time in a direction at right angles to the direction 20–26. First, the table is moved in the direction indicated by dashed line 30 so that the fiber optics element which initially was over point 28 reaches point 32 at the edge 34 of terminal 12b. Again a count indicative of the distance $d_g$ which is moved is generated and recorded. Thereafter, the table is moved through a fixed distance $d_h$, as indicated by dashed line 36, so that the fiber optics element is over point 38. (The distance $d_h$, in practice, may be equal to $d_f$.) As in the case of the previous movements, if the board were accurately centered to start with, $d_g$ would be equal to $d_h$ and point 38 would fall over point 28 and point 18. In the present illustration, this is not the case—the difference between $d_g$ and $d_h$ being the error quantity $E_y$.

It readily can be seen that if the table is moved so that the board is returned to its initial position with the fiber optics element over point 14 and the table is then corrected by moving it the distances $E_y$ and $E_x$ in the directions indicated by the dashed lines 29 and 31, the fiber optics element would be located over point 14a. As a first approximation, the position 14a is the true center of the area surrounded by the terminals. However, this assumes that all of the the others, are of the same size, and the printing is properly centered on the board and in the same relative position on each board and these are not valid assumptions. Moreover, this also assumes that the edges such as 22 and 34 of the metal terminal are straight lines and this is not a valid assumption either. In fact, these edges are randomly "rough" or irregular and the distance such as $d_e$ and $d_o$ may, in some cases, be to a trough in the wavelike edge and in other instances to a crest in the wavelike edge.

For all of these reasons, it is generally desirable to repeat the procedure above for other terminals. This may be done in the following way. First, the table may be moved back to a position such that the errors $E_x$ and $E_y$ are retained. That is, the table may be moved, after the scans described above are completed, from the position at which the fiber optics element is over point 38 to a position at which the fiber optics element is over the starting point 18 for the scans. Then the table may be moved a fixed distance in a predetermined direction, as indicated by dashed line 40, to a new position at which the fiber optics element is over point 42 on terminal 12c. (As an alternative, the vector 38, 18 may be calculated and employed to correct the vector 40 to permit the table to move directly from point 38 to 42.)

After point 42 is reached, the scans in orthogonally related directions are repeated to obtain new error quantities $E_1$ and $E_{y1}$. These new quantities may then be added to the old quantities $E_x$ and $E_y$ obtained as a result of the first set of scans. If these errors are relatively small, this may complete the number of scans which are needed. The sum $E_x$ and $E_{x1}$ may be divided by 2 and the sum $E_y$ and $E_{y2}$ may be divided by 2, in each case to obtain the average error. These average errors may then be employed to correct the initial position of the board in the manner discussed above. That is, the table may be moved back to its initial position (fiber optics element over point 14) and the table then moved amounts $(E_y=E_{yl})/2$ and $(E_x+E_{xl})/2$ in the y and x directions, respectively, to reach a position such that the fiber optics element points at the exact center 14a1 (not shown) of the region surrounded by the terminals 12a... 12d. Alternatively, calculations may be made to permit the direct movement of the table from its last position, directly to one at which the fiber optics element is over point 14a1 (not legended).

If two sets of scans are insufficient to center the bonding location on the board, the same procedure may be repeated for the third terminal 12d and, if necessary, the fourth terminal 12a. All scans, as will be explained shortly, can be performed under the control of a program stored in a computer and the computer or the programmer can decide on the basis of the size of the errors number of scans which are needed.

Figure 2:
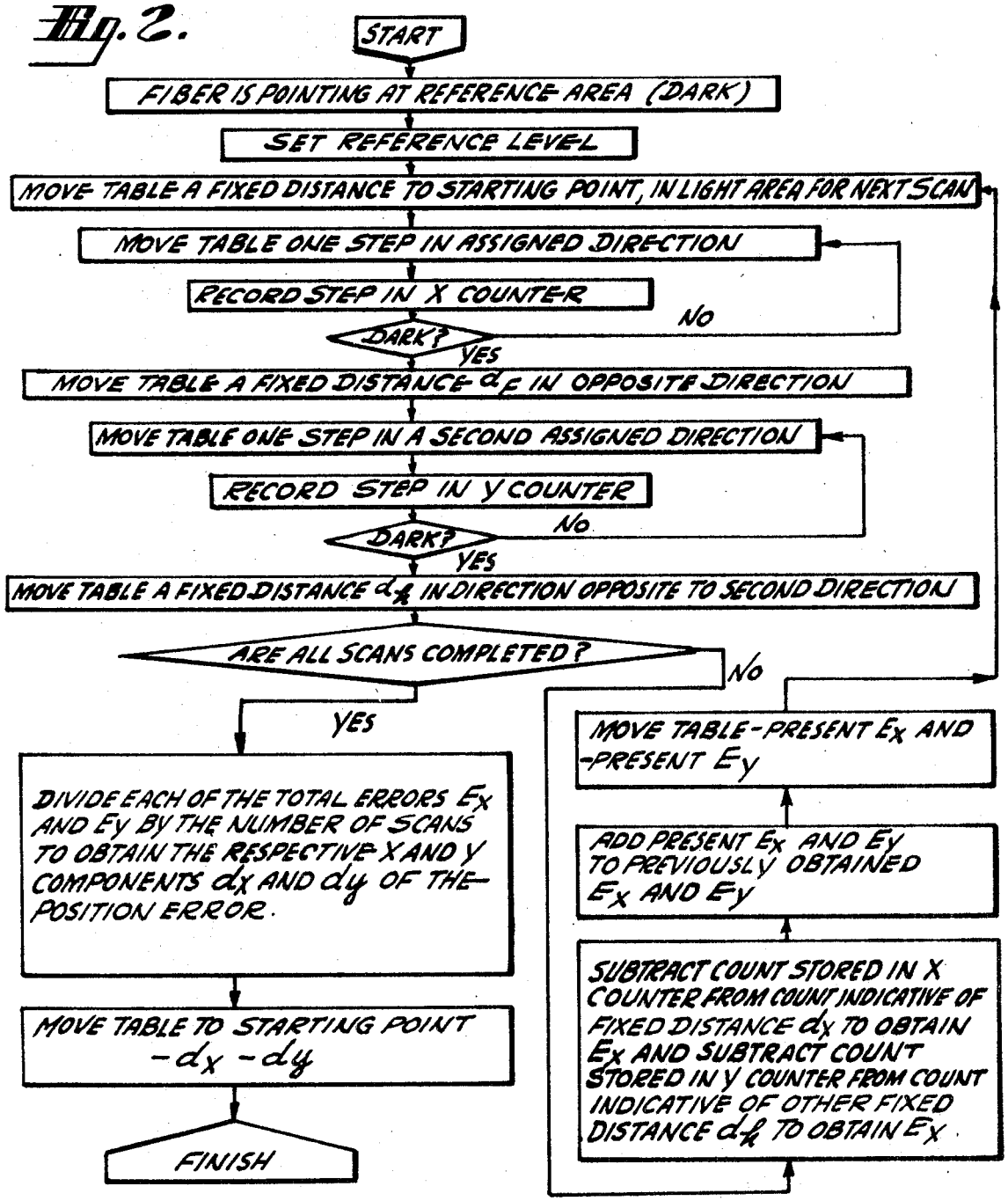
FIG. 2 is a flow chart describing the steps in the operation of the positioning system of the invention.

The apparatus for performing the positioning described above is illustrated in FIG. 3 and the flow chart for the operation of the apparatus is shown in FIG. 2. The board 50 is located on an XY table 52. The board is illuminated by a light source 54 and reflector 56 within a microscopelike apparatus 57. The light produced by the source and reflected from the reflector is projected onto a mirror 58 and from the mirror onto a restricted area of the board. The light reflected from the board is focused by a lens system, illustrated schematically by the single lens 60, onto the end of a fiber optics element 62. This light passes through an aperture in mirror 58 or, as an alternative, a half-silvered mirror may be employed.

The microscope 57 also includes a lens 63 to permit viewing of the region of the board 50 over which the end of the fiber optics element is located. In practice, this end is positioned in the center of the field of view. The microscope is maintained in a fixed position relative to the table and relative to the bonding head (not shown) used for holding the chip (not shown) and bonding the chip to the board 50 below.

The fiber optics element is of very small diameter as, for example, 2.0 mils. The effective area viewed is one-tenth this size, that is, 0.2 mil, due to the use of an objective lens having a magnification of 10. Light passing through the fiber optics element is applied to a photomultiplier 64 and the direct current level produced by the photomultiplier is amplified by the amplifier 66. The latter applies its output in one input to comparator 68. The second input to the comparator is a direct current level produced by the dark reference level circuit 70. The latter may, for example, include a direct voltage source, a potentiometer connected to said source and a lead from a tap on the potentiometer to the comparator. The output produced by circuit 70 may be adjusted by a servo circuit within block 70. This servo circuit, upon command from the computer, is closed and drives the potentiometer tap to a position such that the comparator output is at a predetermined value.

The drive means for the XY table 52 comprises X and Y stepping motors 72 and 74, respectively. AND gates 76 and 78, when enabled, permit oscillator 80 to apply pulses to the respective motors for energizing said motors. Each pulse causes the motor to move the table a distance of 0.25 mil. The pulses applied to the motors are also applied to X and Y counters 82 and 84, respectively. The counts recorded by these counters therefore are indicative of the number of pulses applied to the respective motors and are also indicative of the distances in the X and Y directions through which the X and Y motors have moved the table 52.

The operation of the system is under the control of a general purpose digital computer 90 of the stored program type as, for example, one of the RCA Spectra 70 computers or any other general purpose computer such as a Digital Equipment Corp. PDP8 computer. For purposes of the present explanation, it will be assumed that many of the control steps are performed internally of the computer 90 under program control, however, it is to be understood that control circuits external of the computer could be employed instead. The decision, in each case, as to how much of the operation will be performed under program control and how much under "hardware" control depends upon practical considerations such as the size of the computer, the time which is available for the computer to devote to table positioning and so on.

Figure 3:
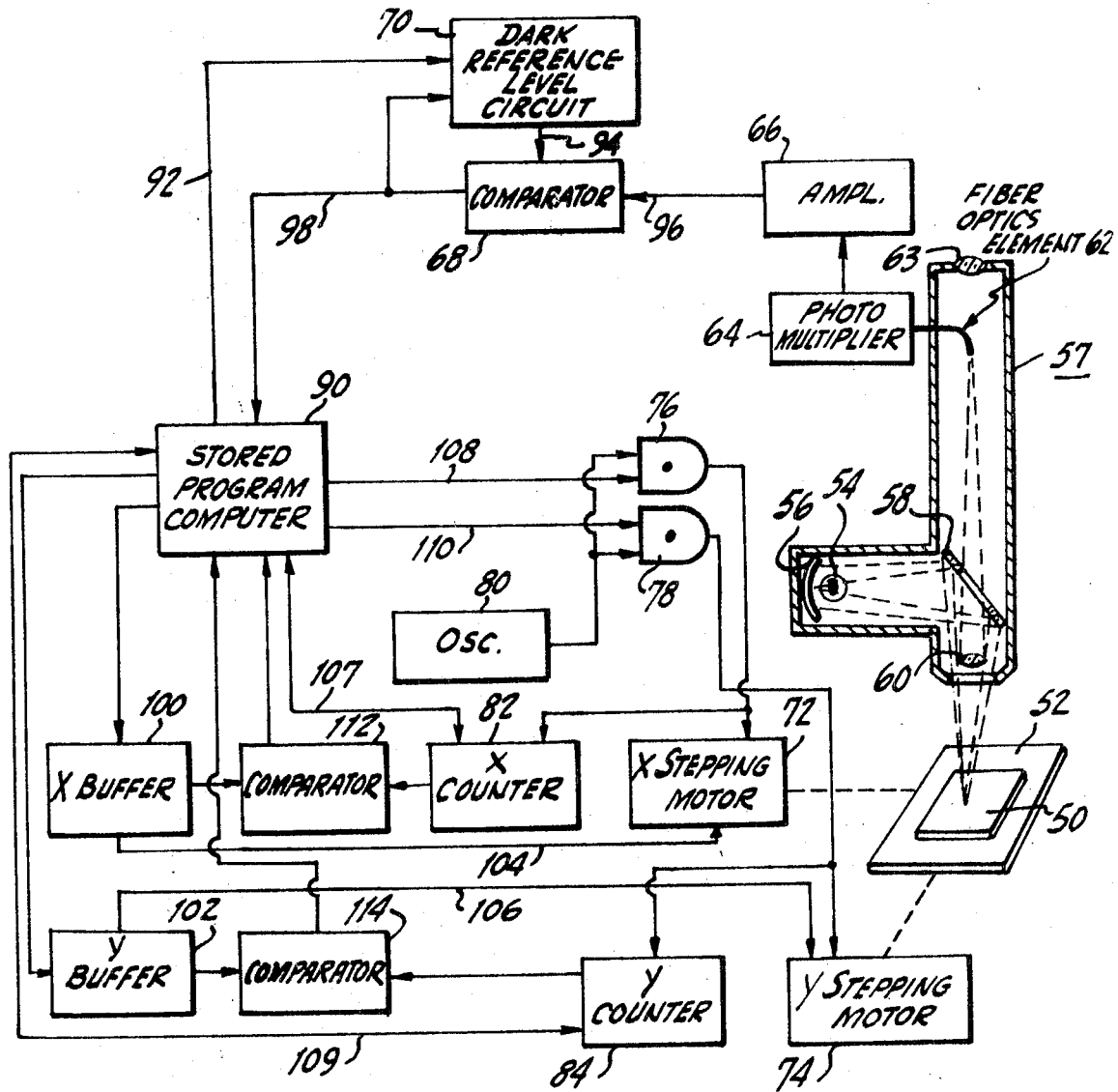
FIG. 3 is a block and schematic circuit diagram of an embodiment of the present invention.

In the discussion which follows of the operation of the system of FIG. 3, both FIGS. 1 and 3 should be referred to. The board 50 initially is placed in a predetermined position on the table such that the fiber optics element is located over point 14 (FIG. 1). Upon command from the computer 90 via line 92, the servo loop in the system 68-70 is closed and the direct voltage level on lead 94 is adjusted to a value close to that of the direct voltage level on lead 96. When the adjustment is completed, the comparator output present on lead 98 drops to a predetermined level and the computer 90 then causes the servo loop of the system 70-68 to open. The dark reference level circuit is now adjusted.

The computer 90 now causes to be stored in the X and X buffers 100 and 102 numbers indicative of the amount and direction of movement desired from point 14 (FIG. 1) to point 18. The direction of movement in each case may be indicated by a single binary digit, the value of which, 1 or 0, indicates to the respective motors whether clockwise or counterclockwise rotation is desired. This information is communicated to the motors over leads 104 and 106, respectively.

The computer also resets the X and Y counters 82 and 84 via lines 107 and 109. The computer then applies enabling signals via leads 108 and 110 to the AND gates 76 and 78. When the AND gates are enabled, oscillator 80 applies pulses through these AND gates to the X and Y stepping motors, which pulses drive the table the desired amount in the desired direction. When the table reaches a position such that the fiber optics element is located over point 18, the count recorded in the X counter 82 is equal to a corresponding count recorded in the X buffer 100 and the count recorded in the Y counter 84 is equal to a corresponding count stored in the Y buffer 102. In each case, as soon as equality is reached, the respective comparators 112 and 114 produce outputs which are applied back to the computer and the computer thereupon disables the AND gates 76 and 78. When the AND gates are disabled, the oscillator pulses are prevented from reaching the motors and the motors stop.

After the operations described above, the computer clears the X and Y counters, places a direction command in the X buffer and then causes only the X stepping motor to drive the table 52 in the direction of dashed line 20 (FIG. 1). This is done by enabling only AND gate 76. During the movement of the table, the X counter 82 counts each oscillator pulse and the computer continually senses for the presence of a signal on lead 98 which indicates that the dark area has been reached. Note that the starting position for this scan in the X direction is position 18 in the light area and the scan should be terminated when the fiber optics element senses the edge 22, that is, when the fiber optics element is over point 24. As soon as this signal is produced at lead 98, the computer disables AND gate 76 and the X stepping motor stops. The number stored in the X counter now is indicative of the distance $d_e$ through which the stepping table has moved. This number is transferred from the counter to the memory of the stored program computer via line 107.

During or prior to the start of the movement described above, the computer transfers to the X and Y buffers numbers indicative of the fixed distances $d_f$ and $d_h$. After the scan just discussed, the computer clears the X counter, transfers a new direction command to the X buffer, and then enables AND gate 76 again. Now the stepping motor causes the table 52 to move in the opposite X direction until the count stored in the X counter 82 becomes equal to the count stored in the X buffer 100. When this occurs, the comparator 112 signals the computer and the computer again disables AND gate 76. The computer may now or at a later time subtract from the first number $d_e$ indicative of the distance to the edge, the second number $d_f$ indicative of the fixed distance to obtain a number indicative of $E_x$, the error. These calculations are relatively simple and are performed in the arithmetic unit of the computer under program control. This error number is stored in the memory of the computer.

Steps similar to the above are performed in the system of FIG. 3 to obtain table movements and counts indicative of the distance $d_g$ and $d_h$ and the error quantity $E_y$. As in the previous case, this error quantity is stored in the memory of the computer.

After the steps above, the computer, in a manner similar to that described, causes the table 52 to move from point 38 to point 42 (see FIG. 1). The movement may be a direct movement from point 38 to 42. The distance from 38 to 42 and the direction readily may be computed within the computer by taking into account the quantities $E_x$ and $E_y$ and the fixed quantity already stored in the computer indicative of the distance along line 40 from point 18 to point 42. As an alternative, the computer simply may move the table first from point 38 to point 18 and then from point 18 to point 42.

At point 42, steps similar to those above are performed to obtain new error quantities $E_{x1}$ and $E_{y1}$. The computer may be programmed to determine from the size of these errors and the previous ones whether additional scans are needed for the determination of accurate corrections for properly centering the table. If no further scans are needed, the $E_x$ and $E_y$ errors are added and averaged and these errors are employed in the manner described in connection with FIG. 1 properly to center the table 14a. On the other hand, if the computer determines that additional scans are needed, it will move the table so that the fiber optics element is over a third point 43 and other points, as necessary, and the system will again repeat the scanning and calculating process.

Figure 4:
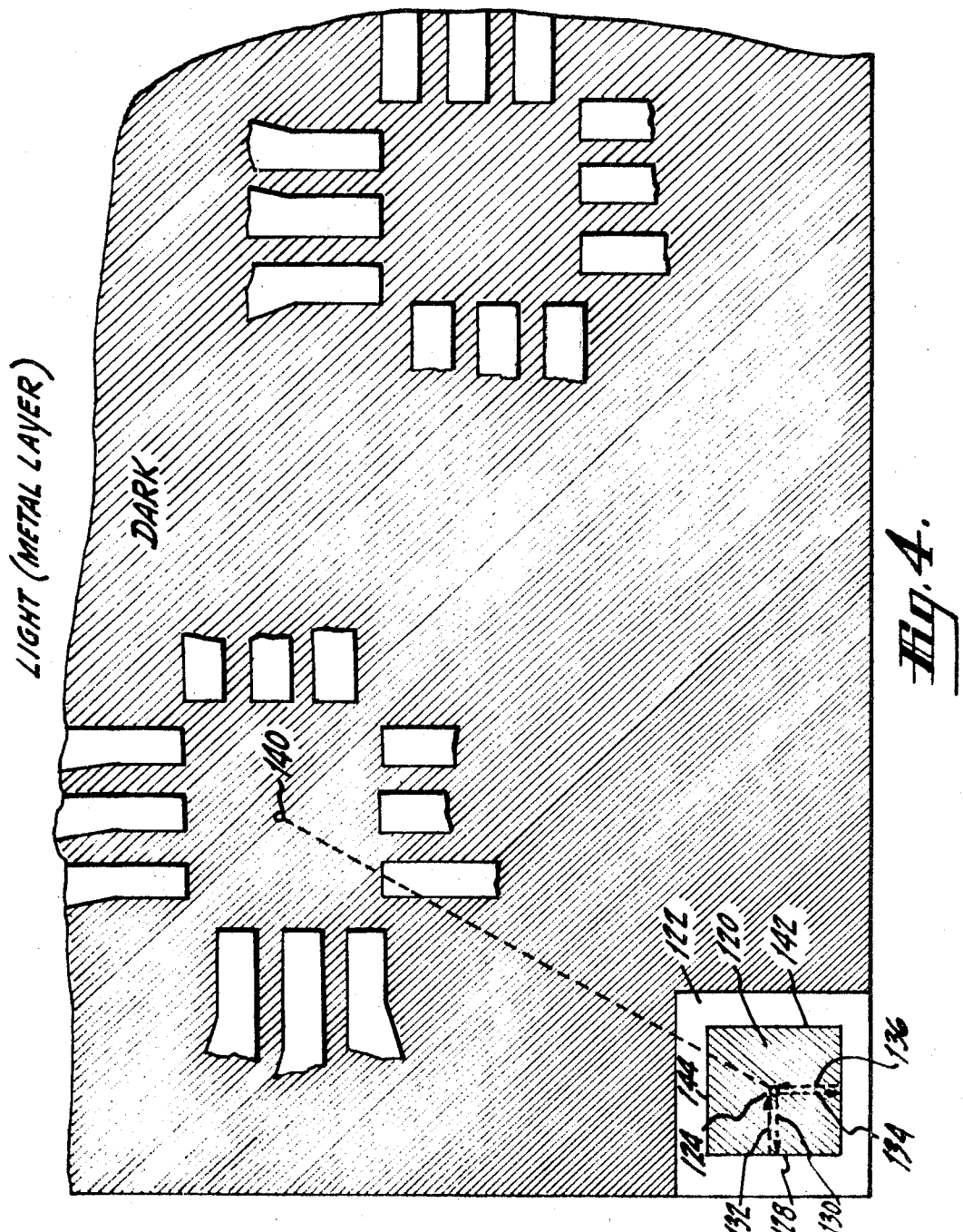
FIG. 4 is a plan view of a portion of another printed circuit board to help explain other features of the invention.

Up to this point it has been assumed that the initial positioning of the board 50 is such that the fiber optics element is over a point such as 14 in FIG. 1. It is also possible and in some cases preferable to operate the system in another way, as will be explained in connection with FIG. 4. Located in a small area in one corner of the board is a dark square area 120 within a printed metal frame 122.

In positioning this board, the initial mechanical alignment is such that the fiber optics element 62 is over point 124. This point is assumed to be a fixed distance such as 3 mils from each of edges 126 and 128. When in this area, the dark reference level circuit 70 (FIG. 3) of the system is adjusted in the manner already described. Then the table is caused to scan in the directions of the dashed lines in a manner analogous to that already described. For example, the first scan may be along line 130 until the edge 128 is located and may then return along the line 132 in a fixed amount equal to exactly 3 mils. A similar scan may be in the direction of line 134 until the edge 126 is located and then the table may return a fixed distance equal to exactly 3 mils along line 136. Upon completion of these scans, the initial "rough" errors in mechanical positioning may be calculated and eliminated in a manner similar to that already discussed.

The system of the present invention is particularly useful in manufacturing environment in which there is a mix of boards, that is, there are boards containing different printed circuits moving along the assembly line. Here, the size of the square 120 may be employed to identify the various boards. For example, for board A, square 120 may be 6 mils by 6 mils, for board B, 8 mils by 8 mils and for board C, 10 mils by 10 mils, where A,B and C refer three different types of boards. To perform the identification, after the initial positioning scan is performed to edges 126 and 128, additional scans may be performed to edges 142 and 144 to permit calculation of the size of the square 120. This information communicated to the computer causes the computer to select from its program repertoire the one corresponding to the particular board it is desired to position.

For purposes of the initial explanation, it is stated that when scanning a metal terminal to determine the position of the edge, the scan is stopped as soon as the edge is reached. This mode of operation is perfectly satisfactory when the metal terminals do not contain imperfections such as scratches or other blemishes which are a different color than the metal. However, if the terminals should contain such scratches the system may mistake a scratch for a terminal edge and this, of course, would be disastrous to the centering operation.

In a preferred form of the invention, means are provided for distinguishing between scratches or other imperfections and an edge. The two are distinguished by making use of the property of imperfections that they are normally relatively narrow—normally less than 1½ mils in thickness. One and one-half mils corresponds to 6 steps of the stepping table (one-fourth mil per step).

In operation in this mode, during a scanning operation such as one starting at 18 of FIG. 1, the computer always stores a number indicative of the amount of light reaching the comparator during the six previous steps of the table. For example, when the fiber optics element reaches edge 24, the AND gate 76 remains enabled and the table continues to move. The fiber optics element, as soon as it passes the edge, sees the dark area and a first count of 1 (001) is stored in the computer. The next step of the table, a second dark area is observed and this information too is stored in the computer as 010. When there are indications of six successive dark areas when the stored number is 110), then the computer disables the AND gate 76 and stops the motor. At a later time when the calculations are made, the quantity of 6 is subtracted from the count indicative of the actual distance scanned to obtain the correct distance from the point 18 to edge 24.

Suppose now that during the movement from 18 to 24 the fiber optics element encounters a scratch in the metal area which is relatively dark. When the fiber optics element reaches this scratch the comparator 68 will produce an output and a number will be stored in the computer indicative of the presence of the dark area. However, as explained above, the scan will continue until six successive such signals are received. If, say after three such signals the end of the scratch is reached, the fiber optics element will again "see" reflected light at high amplitude and this will be signalled to the computer via line 98. Thereupon, under program control, the stored number 011 indicative of a dark area three steps (0.75 mil) wide is changed back to 000. Since a scratch normally is less than 1½ mils in width (the equivalent of six steps of the table) the scan will continue over the scratch ignoring the scratch. If the scratch is greater than 1½ mils in width, the computer will cause the X stepping motor to stop before an edge of the terminal has been reached. This means that the centering of the board will be all wrong and that the bonding process, if permitted to continue, will ruin the board. However, the board should be scrapped anyhow as a scratch 1½ or more mils in width can be expected adversely to affect the operation of the printed circuit.

Figure 5:
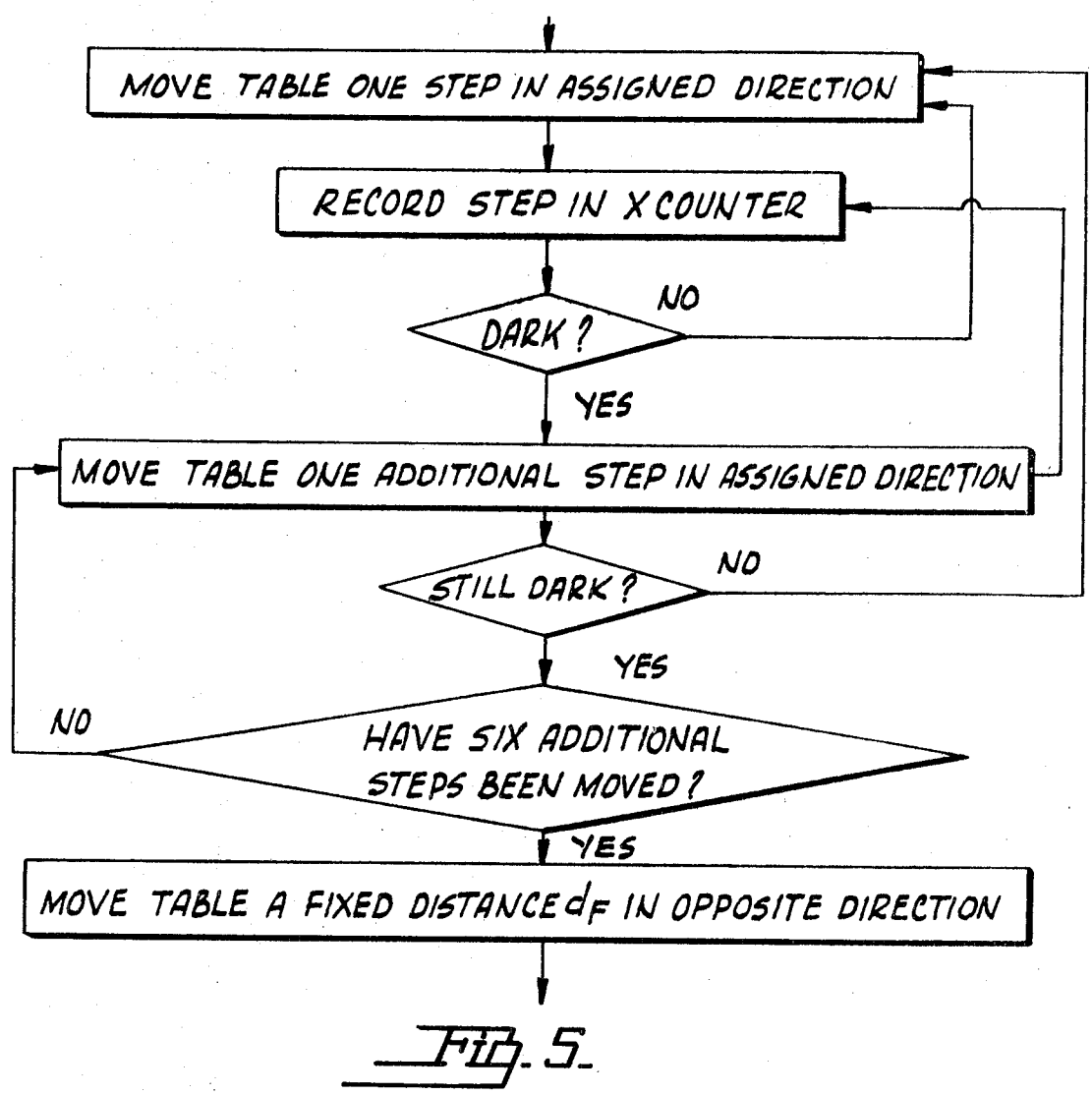
FIG. 5 is a flow chart illustrating how a scratch or other imperfection may be distinguished from a true edge in the positioning method of the invention.

The flow chart of FIG. 5 illustrates the method of distinguishing scratches from true edges discussed above. This flow chart deals only with the movement in the X direction. The movement in the Y direction is similar and therefore is not illustrated separately.

The first three blocks and the last block of FIG. 5 are also present in FIG. 2; the fourth, fifth and sixth blocks of the flow chart of FIG. 5 are not present in FIG. 2. They describe the movement during which a determination is made of whether or not the light transition which was sensed was a true edge indication or was a scratch.

After a light to dark transition is sensed ("yes" after the third block of FIG. 5) the table is moved one additional step in the assigned direction (the fourth block) and the step is recorded in the X counter. This is repeated a number of times and in each case the system senses whether the fiber optics element still is looking at a dark area. If within six steps the answer is no, this means that the transition sensed was a scratch and in this case the first block of FIG. 5 is returned to. If six additional steps have been moved (the sixth block) and the fiber optics element is still looking at a dark area ("yes" after the sixth block) then the table is moved in the opposite direction as indicated in the last block.

In a practical embodiment of the present invention, the table 52 and its associated motors are commercially available. For example, these three units are included in a system manufactured by TAC Corporation, identified as Model No. X-Y 500. As already mentioned, the system may be operated under program control in a manner shown in FIG. 3. However, as an alternative, an external motor control system, such as the SLO-SYN SP 250 Preset Indexer—a commercially available unit—may be employed instead.

It is also to be understood that while one specific embodiment of the invention has been described, many alternatives are possible. As one example, the counters, such as the X and Y counters, may be backward counters. The number stored in a buffer such as the X buffer 100 may be transferred to the X counter and the X counter caused by the oscillator 180 to count backward until the count stored by the counter is zero. In this case, the comparator such as 112 would be replaced by a zero count detector.

It is also to be understood that while in the present example the fiber optics element is fixed to a bonding machine (not shown) which is rather massive compared to the board 50 so that it is preferable to move the board and to maintain the bonding machine and fiber optics element stationary, another mode of operation is possible. In cases in which the object is relatively massive and the means employed to machine or otherwise interact with the object is relatively small, it may be preferred to maintain the object stationary and to move the fiber optics element and the machine to which the fiber optics element is secured.

In the embodiment of the invention discussed herein, the substrate is dark and the metal areas are light. It is to be understood that the invention is equally useful for centering boards with relatively light substrates and relatively dark metal areas. In these cases, the initial adjustment of the comparator 68 can be exactly as in the case already discussed or the comparator may be adjusted to produce a predetermined minimal output when the fiber optics element is pointed at the light substrate. The system of FIG. 3 readily can handle boards of this type mixed in with the boards having dark substrates and the selection of an appropriate stored program may be automatic and may be in response to an identification mark on the board comparable to the mark (the square 120) on the board of FIG. 4.

What I claim is:

1. In a machine-implemented method for adjusting the relative position between an object and a reference point external of the object, the steps of:
   producing relative movement in one direction between the object and said reference point external of said object to determine the actual distance $d_e$ between a first indicium on the object and said reference point and producing a signal manifestation indicative of said actual distance $d_e$;
   producing relative movement in the opposite direction between said object and reference point in an amount to position said indicium a predetermined distance $d_f$ from said reference point, where $d_f$ is the actual distance between the indicium and reference point when the initial relative position of the object is correct;
   producing relative movement in a second direction between said object and said reference point external of said object to determine the actual distance $d_g$ between a second indicium on said object and said reference point and producing a signal manifestation indicative of said actual distance $d_g$;
   producing relative movement in a direction opposite to said second direction between said object and reference point in an amount to position said second indicium a predetermined distance $d_h$ from said reference point, where $d_h$ is the actual distance between the second indicium and reference point when the initial relative position of the object is correct; and
   producing signal manifestations indicative of $d_e - d_f$ and $d_g - d_h$.

2. In a method as set forth in claim 1, said movement in a second direction being performed in a direction substantially at right angles to said one direction.

3. A machine-implement method for adjusting the relative position between an object and a reference point external of the object comprising the steps of:
   producing a first count indicative of the amount of relative movement in one direction between the object and a reference point external of the object required to traverse the distance $d_e$ between a first indicium on the object and said reference point;
   producing a second count indicative of the amount of relative movement in the opposite direction between said object and reference point required to traverse a predetermined distance $d_f$ between said indicium and said reference point, where $d_f$ is the actual distance between the indicium and reference point when the initial relative position of the object is correct;
   producing a third count indicative of the amount of relative movement in a second direction between said object and said reference point external of said object required to traverse the distance $d_g$ between a second indicium on said object and reference point;
   producing a fourth count indicative of the amount of relative movement in a direction opposite to said second direction between said object and reference point required to traverse a predetermined distance $d_h$ between said second indicium and said reference point, where $d_h$ is the actual distance between the second indicium and reference point when the initial relative position of the object is correct; and
   changing the relative position between said object and said reference point in an amount and direction which are dependent on the difference between the counts indicative of $d_e$ and $d_f$ and the difference between the counts indicative of $d_g$ and $d_h$.

4. A machine-implemented method for adjusting the relative position with respect to a light-sensing means of an object having light and dark areas and edges defining the transitions between these areas, comprising the steps of:
- sensing with said light-sensing means the amount of light reflected from a restricted portion of said object;
- producing relative movement in one direction between said light-sensing means and said object, and terminating said movement in response to the sensing by said light-sensing means of a change in the amount of light reflected from said object which is indicative of one of said edges;
- producing a first binary count indicative of the extent of said relative movement;
- producing relative movement in the opposite direction between said light-sensing means and said object through a fixed distance equal to the actual distance from said one edge to the restricted area over which said light-sensing means should be positioned when the object is in its desired position;
- producing a second binary count indicative of the extent of said relative movement in the opposite direction;
- producing relative movement in a third direction between said light-sensing means and said object, and terminating said movement in response to the sensing by said light-sensing means of a change in the amount of light from said object which is indicative of another of said edges;
- producing a third count indicative of the extent of said relative movement in said third direction;
- producing relative movement in a direction opposite to said third direction between said light-sensing means and said object through a distance equal to the actual distance from said second edge to the restricted area over which said light-sensing means should be positioned when the object is in its desired position; and
- producing a fourth count indicative of the extent of said relative movement in a direction opposite to said third direction.

5. The method set forth in claim 4 wherein each step in which the relative movement between the light-sensing means and object is terminated in response to the sensing by the light-sensing means of a change in the amount of light reflected from said object occurs a relatively short interval of time after the change is sensed and includes:
- sensing with the light-sensing means for a change in the amount of reflected light;
- continuing to produce relative movement for a short distance after this change has been sensed while sensing with the light-sensing means for a change back to its initial level of the amount of reflected light; and
- stopping the movement only if the light sensed does not change back to its initial level during the movement through this short distance.

6. A machine-implemented method for distinguishing an edge between relatively large light and dark areas on an object beam scanned by light from a relatively narrow imperfection such as a scratch comprising the steps of:
- scanning the object in a given direction;
- causing the scan to continue in the same direction after an abrupt change in light level has been sensed;
- continuing to scan in the same direction when a second abrupt change in light level occurs in a sense opposite to the first abrupt change in light level within a predetermined scanning distance after the first abrupt change in light level has been sensed; and
- terminating the scan and indicating that the first abrupt change in light level which was sensed defines the position of an edge between relatively large light and dark areas, when after said abrupt change in light level has been sensed, no further abrupt change in light level occurs within said given scanning distance.